Patented Feb. 17, 1953

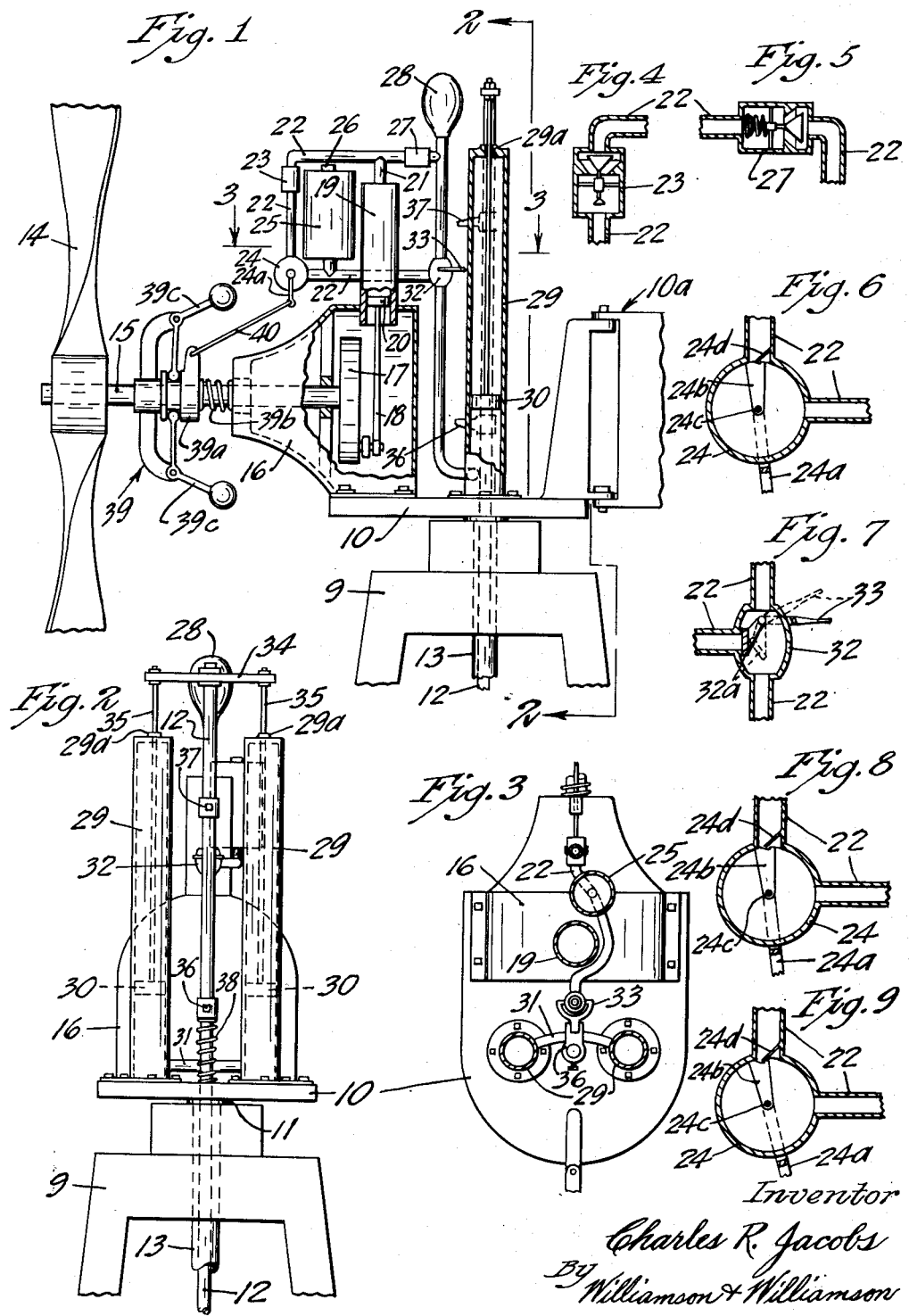

2,628,564

UNITED STATES PATENT OFFICE 2,628,564

HYDRAULIC SYSTEM FOR TRANSFERRING ROTARY MOTION TO RECIPROCATING MOTION

Charles R. Jacobs, Del Paso Heights, Calif.

Application December 1, 1949, Serial No. 130,488

3 Claims. (Cl. 103—35)

This invention relates to a hydraulic system for transferring rotary motion to reciprocating motion and particularly to a system adapted for use with windmills to actuate the reciprocable pump thereof.

It is an object of my invention to provide a novel and improved hydraulic system particularly adapted for connection with a source of rotary power, such as a windmill, to produce reciprocating pumping action in a conventional reciprocating type of water pump.

It is another object to provide a hydraulic system for actuating a reciprocable pump member and having a speed controlled valve mechanism designed to restrict the flow of fluid at slow speeds to permit substantially free rotation of the power source, to permit substantially unrestricted flow of fluid at moderate speeds to produce maximum pumping action, and to again restrict the flow of fluid at high speeds to prevent excessive pressures from being built up in the system.

It is still a further object to provide a hydraulic system adapted to be connected to a source of rotary power to alternately supply fluid under pressure and release said pressure to reciprocate a reciprocable member.

It is still another object to provide a governor actuated valve mechanism for use with hydraulic systems to permit the volume of fluid being pumped to be varied with the speed of rotation of the power source.

These and other objects and advantages of my invention will more fully appear from the following description made in connection with the accompanying drawing wherein like reference characters refer to the same or similar parts throughout the several views and in which:

Fig. 1 is a side elevational view partially in vertical section showing my hydraulic system as connected to a conventional windmill pumping mechanism;

Fig. 2 is an end elevational view as viewed from line 2—2 of Fig. 1;

Fig. 3 is a top plan view of the structure shown in Figs. 1 and 2;

Figs. 4 and 5 are detailed sectional views of the two check valves used in the hydraulic system;

Figs. 6, 8 and 9 are detailed sectional views of the governor actuated fluid control valve showing three different positions thereof; and Fig. 7 is a detailed sectional view of the release valve showing the same in closed position by full lines and in open position by dotted lines.

As illustrated in the accompanying drawing, I provide a governor controlled hydraulic system adapted to be connected to a source of rotary power, such as a windmill, and to compensate for variations in the speed of rotation to produce desired variations in the flow of fluid for variations in the rotation speed.

As best shown in Figs. 1 and 2, there is provided a conventional supporting structure 9 with a mounting platform 10 swivelly connected thereto for rotation about sleeve 11 as an axis. A reciprocable pump rod 12 is surrounded by a fixed tubular casing 13 for reciprocation therein, and extends a substantial distance above platform 10 in sliding relation thereto. A windmill propeller 14 is fixed to a propeller shaft 15 which is journalled in a suitable bearing support 16 and a wheel 17 is fixed at the inner end of the shaft 15 with a pitman rod 18 eccentrically connected thereto. A conventional windmill rudder fin mechanism designated as an entirety by the numeral 10a is connected with the platform 10 to keep the propeller 14 headed at any desired angulation relative to the wind direction. A cylinder 19 is mounted above said pitman rod 18 and a piston is fixed to the upper end of rod 18 and positioned in sealed relation to the inside of cylinder 19 to work therein. A conduit 21 is provided in the upper portion of cylinder 19 and is interconnected with a fluid supply line 22. A check valve 23 is interposed into supply line 22, as best shown in Figs. 1 and 4. A governor actuated fluid control valve 24 is also interposed into fluid supply line 22 and a reservoir 25 having a vent 26 in the top thereof is connected to fluid supply line 22, as best shown in Figs. 1 and 3.

The supply line 22 has a second check valve 27, as best shown in Figs. 1 and 5, connected therewith on the opposite side of cylinder 19 from check valve 23 and adapted to prevent flow back to said cylinder while check valve 23 is adapted to prevent flow through line 22 away from said cylinder. An air dome 28 is provided in supply line 23, as best shown in Figs. 1 and 2, to maintain a substantially equal flow of fluid from cylinder 19 through line 22. The fluid supply line 22 extends to a pair of hydraulic rams, each of which has a cylinder 29 and a piston 30, and is respectively connected at the bottom of cylinders 29 as by the branch conduits, as best shown in Figs. 2 and 3. A release valve 32 is interposed into the supply line 22 between the dome 28 and the branch conduits 31 and the supply line 22 forms a closed loop by having a portion thereof extend from the reservoir 25 directly into the release valve 32, as best shown in Figs. 1 and 7. A valve operating lever 33 controls the position of the valve closure element 32a to release the pressure in the line 22 and permit back flow of fluid through said line to the reservoir 25.

The pump rod 12 is connected to the pistons 30 as by a yoke 34 and a pair of connecting rods 35 which respectively interconnect the pistons 30 with the end portions of the yoke 34. A suitable guiding bushing 29a is provided at the top of each cylinder 29 to guide the rods 35 in an up and down movement with the pistons 30. The yoke 34 is connected at the top of the reciprocable pump rod 12 for actuating the same, and a pair of outstanding valve shifting stop elements 36 and 37 are fixed in spaced relation to the upper portion of rod 12 and are adapted to contact the valve control element 33 when said rod has been shifted a predetermined distance. A cushioning spring is interposed between the lower stop element 36 and the platform 10 to cushion the bottom of the reciprocating stroke of rod 12. A conventional weight governor designated as an entirety by the numeral 39 is mounted on shaft 15 for rotation therewith. A longitudinally shiftable sleeve 39a having an annular groove formed therein is provided and a link 40 interconnects said sleeve with the actuating element 24a of control valve 24 and a spring 39b urges said sleeve 39a outwardly and the weights 39c due to the centrifugal force thereof urge the sleeve inwardly against the force of spring 39b.

The valve 24 is shown in its three positions in Figs. 6, 8 and 9. The valve element 24b consists of a radially extending member fixed to a central shaft 24c and having a pair of spaced closure surfaces disposed on the outer extremity thereof. A V-shaped notch is cut into the outer extremity between said surfaces to permit substantially unrestricted flow of fluid around the end portion of valve element 24b. An angularly disposed closure plate 24d is fixed within conduit 22 adjacent valve 24, and extends angularly downwardly to a point where the lower extremity thereof is disposed tangentially to the inner valve chamber. As long as the said lower extremity is in contact with one of the outer surfaces of the valve element 24b the flow through the valve is materially restricted, as shown in Figs. 6 and 9. However, with the notched portion disposed adjacent the lower extremity of closure element 24d substantially unrestricted flow of fluid upwardly from the reservoir 25 to the cylinder 19 is permitted. Any suitable packing can be provided for the shaft 24c and for the shaft on which the valve element 32a is mounted to prevent leakage around said shafts.

The following is a description of the operation of my hydraulic pumping system for reciprocating reciprocable members. When the shaft 15 is rotated as by the propeller 14 the pitman actuated piston 20 is reciprocated within cylinder 19 and alternately draws fluid into said cylinder and forces said fluid out into the supply line 22 and through valve 32 into the two cylinders 29. When the rotation of shaft 15 is relatively slow the valve element 24b of the valve 24 will be in the position shown in Fig. 6 and will restrict the flow of fluid from the reservoir into the cylinder 19 and maintain the resistance to rotation exerted by the piston 20 at a minimum to permit the speed to be easily increased by permitting substantially free rotation of said shaft. As the speed of the shaft increases the governor weights 39c will be centrifugally extended to shift the valve control arm 24a inwardly and move the valve element 24b into the position shown in Fig. 8 and permit a maximum flow of fluid into the cylinder 19 to produce fast pumping action on the rod 12. As the speed increases further the governor weights 39c will shift the sleeve 39a still further inwardly into the position shown in Fig. 9 to again restrict the flow of fluid through the valve 24 and thereby prevent harm to the pistons 20 and 30 that might be caused by excessive speeds and pressures built up thereby in the system.

As the pistons 30 travel upwardly the stop elements 36 and 37 will be moved upwardly along with the rod 12 and when the lower stop element 36 reaches the valve control lever 33 it will shift the same upwardly into the dotted position shown in Fig. 7 to open the valve and release the pressure in the cylinders and permit the rod 12 to return to the bottom of the stroke, the fluid being forced back into the reservoir 25. At the bottom of the stroke the stop element 37 engages the spring valve actuating arm 33 and returns said valve to closed position, as shown by full lines in Fig. 7, to permit pressures to again be built up within the cylinders 29. The air dome 28 tends to equalize the pressure in the line during the pumping stroke of the pistons 30 and maintains substantially even flow of fluid into said pistons. The two check valves 23 and 27 permit the pressure in the line 22 which is produced by the piston 20 to be maintained. The check valve 27 is positioned to permit negative pressure to be maintained during the downward stroke of the piston 20 without producing a negative pressure line 22 on the other side of said valve 27 and the valve 23 is positioned to permit positive pressures to be maintained in said line 22 during the upward stroke of the piston 20 to force fluid into the cylinder 29.

It will be seen that I have provided a relatively simple, highly efficient hydraulic system for transferring rotary action to reciprocating action, and particularly adapted for use with wind operated pumps. My improved system provides its own governor actuated control which permits substantially free rotation at extremely slow speeds while producing maximum pumping action at moderate speeds and producing substantially free rotation and restricted pumping action at high speeds to prevent excessive pressures from injuring the parts of the system. Thus, it should be noted that a conventional propeller such as the propeller 14 without any speed controls thereon can be used.

It will, of course, be understood, that various changes may be made in the form, details, arrangement and proportions of the parts without departing from the scope of my invention.

What I claim is:

1. A hydraulically actuated liquid pumping system solely responsive for operation to the force of the wind, said system comprising a supporting structure, a propeller journalled for rotation on said supporting structure and responsive solely to the force of the wind for said rotation, a hydraulic pump actuating system connected with said propeller to be driven thereby and including a fluid pump mechanism connected with said propeller, a fluid reservoir connected with said pump for supplying fluid thereto, a governor controlled valve member constructed to be shifted into a plurality of positions and controlling the flow of fluid pumped by each stroke of said fluid pump mechanism, a centrifugally operated mechanism connected with said propeller and responsive for operation to the speed of rotation thereof and connected with said valve to vary the position thereof with variations in the speed of rotation whereby said valve will be partially closed at extremely slow speeds to reduce resistance to pumping action in said pumping mechanism, said valve being shifted to wide open position for moderate speeds of rotation and being shifted toward closed position to restrict the flow of fluid at extremely high speeds.

2. A hydraulically actuated liquid pumping system comprising a fluid pump adapted to be driven by a source of rotary power, a governor adapted to be also driven by said power source and having a shiftable element responsive for shifting movement to variations in speed of rotation of said power source, means for supplying fluid to said pump, a flow control valve cooperatively associated with said pump to vary the volume of fluid pumped by each stroke thereof and having a shiftable valve member mounted therein, means interconnecting said shiftable governor element and said shiftable valve member, said valve member having a pair of spaced closure elements, a stationary closure member mounted in said valve in cooperative association with said valve member, the shiftable element of said governor moving said valve closing elements relative to the stationary valve closure member to vary with variations in the speed of rotation of said power source the volume of fluid pumped by each stroke of said fluid pump.

3. A hydraulic system comprising a fluid pump adapted to be driven by a source of rotary power, a governor adapted to be driven by said power source and having a shiftable element responsive for shifting movement to variations in the speed of rotation of said power source, a reservoir for supplying fluid to said pump, a fluid supply line interconnecting said reservoir and said pump, a control valve interposed in said supply line and having a shiftable valve element mounted therein, an actuating lever connected to said valve element, a link interconnecting said actuating lever and said shiftable governor element, an angularly disposed closure plate having its edge portion in close association with the end of said valve element, a notch in the end of said valve element dividing the same into two spaced closure surfaces, said governor element shifting said valve element to permit the flow of fluid through said valve to be varied with the speed of rotation of the power source.

CHARLES R. JACOBS.

REFERENCES CITED

The following references are of record in the file of this patent:

UNITED STATES PATENTS

| Number | Name | Date |
| --- | --- | --- |
| 692,879 | Lemp | Feb. 11, 1902 |
| 743,484 | Gerdes | Nov. 10, 1903 |
| 1,619,474 | Hubbard | Mar. 1, 1927 |
| 2,127,168 | Grant | Aug. 16, 1938 |
| 2,131,910 | Vernon et al. | Oct. 4, 1938 |
| 2,282,977 | Mast | May 12, 1942 |
| 2,299,692 | Goehring | Oct. 20, 1942 |